(12) United States Patent
Finkel

(10) Patent No.: US 9,684,976 B2
(45) Date of Patent: Jun. 20, 2017

(54) OPERATING SYSTEM-RESIDENT DISPLAY MODULE PARAMETER SELECTION SYSTEM

(71) Applicant: SnapTrack, Inc., San Diego, CA (US)

(72) Inventor: Brian Scott Finkel, Acton, MA (US)

(73) Assignee: QUALCOMM Incorporated, San Diego, CA (US)

(*) Notice: Subject to any disclaimer, the term of this patent is extended or adjusted under 35 U.S.C. 154(b) by 229 days.

(21) Appl. No.: 13/800,833

(22) Filed: Mar. 13, 2013

(65) Prior Publication Data

US 2014/0267360 A1 Sep. 18, 2014

(51) Int. Cl.
*G09G 5/02* (2006.01)
*G06T 11/00* (2006.01)
*G09G 3/20* (2006.01)
*H04N 21/45* (2011.01)

(52) U.S. Cl.
CPC ............ *G06T 11/001* (2013.01); *G09G 3/20* (2013.01); *G09G 2320/06* (2013.01); *G09G 2320/0613* (2013.01); *G09G 2320/0666* (2013.01); *G09G 2340/0428* (2013.01); *G09G 2340/0435* (2013.01); *G09G 2370/042* (2013.01); *H04N 21/4516* (2013.01)

(58) Field of Classification Search
CPC ............................... H04N 1/6058; G09G 5/02
USPC ......................................................... 345/590
See application file for complete search history.

(56) References Cited

U.S. PATENT DOCUMENTS 6,339,429 B1* 1/2002 Schug ........................... 345/589
2002/0175946 A1 11/2002 Sakuta et al.
2003/0226049 A1 12/2003 Mantani
(Continued)

FOREIGN PATENT DOCUMENTS

CN 1595488 A 3/2005
EP 1256923 A2 11/2002
EP 2518719 A2 10/2012

OTHER PUBLICATIONS

Adam Simmons, "ASUS VG248QE", http://pcmonitors.info/reviews/asus-vg248qe/, Feb. 22, 2013.*

(Continued)

*Primary Examiner* — Devona Faulk
*Assistant Examiner* — Jin Ge
(74) *Attorney, Agent, or Firm* — Foley & Lardner LLP

(57) ABSTRACT

A display module parameter selection system is presented. A processor can be coupled to a display. The processor can be configured to execute software applications, each having corresponding graphical output specifications. The processor can execute a display control module resident in an operating system. The display control module can maintain an application data structure to store the corresponding graphical output specifications of each of the plurality of software applications. The display control module can maintain a display capability data structure to store a plurality of settings for each of the variable display parameters. In response to one of the plurality of software applications being launched, the display control module can process data stored in the application data structure and the display capability data structure to generate a set of display parameter settings to output to the display module for use in outputting graphical output from the launched application.

28 Claims, 16 Drawing Sheets

(56) References Cited

U.S. PATENT DOCUMENTS

| | | | |
|---|---|---|---|
| 2005/0190190 A1* | 9/2005 | Diard et al. ................. 345/502 |
| 2005/0243282 A1* | 11/2005 | Peterson ............. H04N 9/3155 |
| | | | 353/31 |
| 2006/0017712 A1* | 1/2006 | Iwaki ........................... 345/204 |
| 2006/0092182 A1* | 5/2006 | Diefenbaugh et al. ....... 345/690 |
| 2007/0139405 A1* | 6/2007 | Marcinkiewicz ............. 345/207 |
| 2009/0140971 A1* | 6/2009 | Hernandez et al. .......... 345/102 |
| 2010/0277510 A1 | 11/2010 | Karaoguz et al. |
| 2012/0019152 A1* | 1/2012 | Barnhoefer et al. ......... 315/158 |
| 2012/0200593 A1 | 8/2012 | Todd et al. |
| 2012/0256943 A1 | 10/2012 | Atkins et al. |
| 2012/0287144 A1* | 11/2012 | Gandhi ................ G09G 3/2029 |
| | | | 345/589 |

OTHER PUBLICATIONS

International Search Report and Written Opinion—PCT/US2014/022034—ISA/EPO—Sep. 30, 2014.
Partial International Search Report—PCT/US2014/022034—ISA/EPO—Jun. 17, 2014.

\* cited by examiner

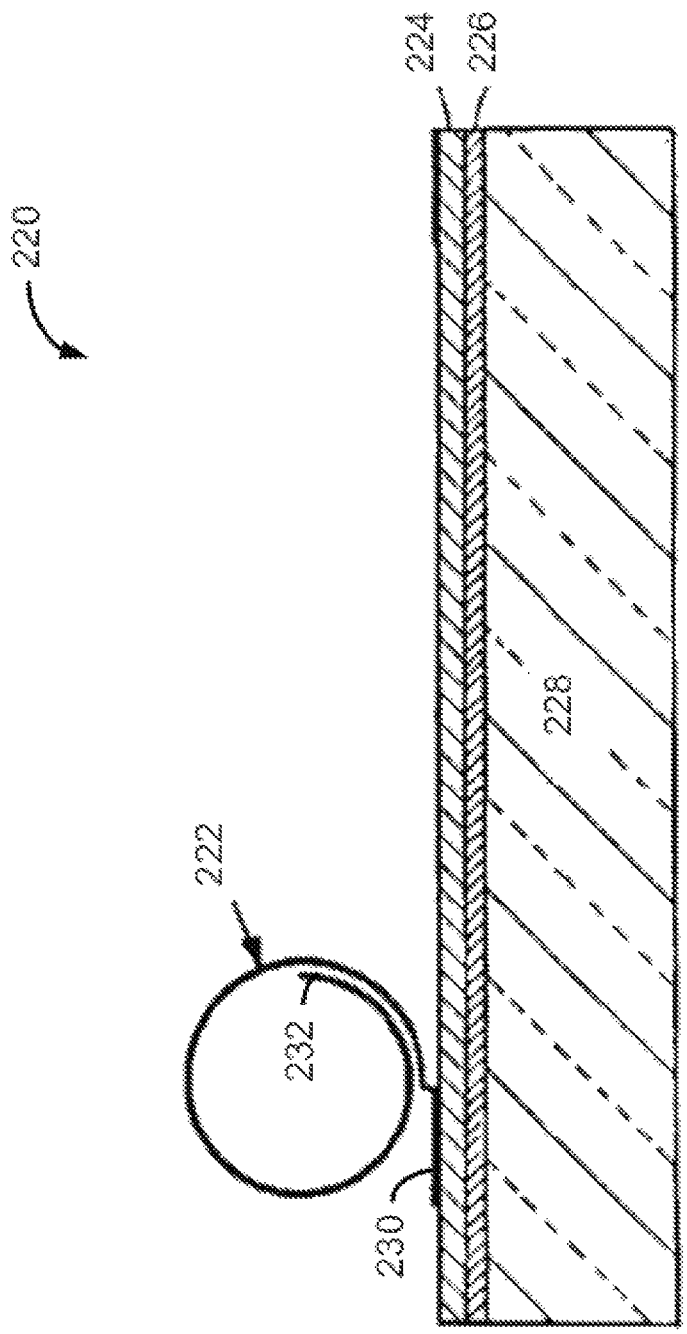

400

402  404

| Application | Frame Rate | | Bit Depth | | Color Gamut | |
|---|---|---|---|---|---|---|
| | Min. | Pref. | Min. | Pref. | Min. | Pref. |
| Web Browser | 30 | 60 | 12 | 24 | 75 | 100 |
| E-Reader | 1 | 15 | 6 | 12 | 10 | 25 |
| Mapping Application | 24 | 30 | 12 | 18 | 25 | 75 |
| Video Game | 30 | 120 | 18 | 24 | 50 | 100 |

| Frame Rate | 60 Hz | 30 Hz | 24 Hz | 1 Hz | | |
|---|---|---|---|---|---|---|
| Color Bit Depth | 24-bits | 18-bits | 15-bits | 12-bits | 9-bits | 3-bits |
| Color Gamut | 130% | 100% | 75% | 50% | 25% | |
| Brightness | 20% | 40% | 60% | 80% | 100% | |

| Display Mode | Frame Rate | Bit Depth | Color Gamut | Max Brightness |
|---|---|---|---|---|
| Power Save | 30 | 6 | 10 | 20% |
| Video Playback | 120 | 24 | 100 | 100% |
| Word Processing | 20 | 1 | 10 | 60% |

Figure 6

1000 maintaining, by an operating system coupled to a computer processor, an application data structure that identifies each of a plurality of software applications executable by the processor and their corresponding graphical output specifications
1005 maintaining, by the operating system, a display capability data structure that identifies a plurality of variable display parameters and a plurality of settings for each of the variable display parameters, based on the capabilities of a display module coupled to the computer processor
1010 receiving, by the operating system, a user request to launch one of the plurality of software applications
1015 selecting, by a display control module responsive to receiving the user request, a set of display parameter settings for use in outputting graphical information from the launched application, wherein the selection is made based on data stored in the application data structure and the display capability data structure
1020 transmitting, by the computer processor, the selected set of display parameter settings to the display module
1025

Figure 10

OPERATING SYSTEM-RESIDENT DISPLAY MODULE PARAMETER SELECTION SYSTEM

TECHNICAL FIELD

This disclosure relates to the field of displays, and in particular, to methods for controlling display settings.

DESCRIPTION OF THE RELATED TECHNOLOGY

Many portable electronic devices, such as smart phones and tablet computers, now execute a wide variety of software applications. Moreover, the set of software applications resident on such electronic devices varies from device to device, and, on the same device, from one day to the next. Each software application may have its own specifications for the presentation of its graphical output. Some applications, such as video editing software, may require relatively high frame rates and a wide color gamut to be able to faithfully reproduce video data. On the other hand, it may be sufficient for an e-reader application to operate using a low frame rate and a highly constrained color gamut.

Displays have been proposed that can dynamically alter their display settings based on a variety of factors. However, given the variability of the output specifications of different software applications and the wide array of software applications that may get installed on an electronic device over its life span, it is impractical for a display device to know which of its display modes are appropriate for each software application. Moreover, given the variability of displays that can get incorporated into an electronic device, it is likewise impractical to require software application designers to be able to tailor their applications to each type of display or to enable such applications to communicate with the each type of display.

SUMMARY

The systems, methods and devices of the disclosure each have several innovative aspects, no single one of which is solely responsible for the desirable attributes disclosed herein.

One innovative aspect of the subject matter described in this disclosure can be implemented in an electronic device. The electronic device can include a display module configurable for generating images according to a plurality of variable display parameters. The electronic device can also include a processor coupled to the display. The processor can be configured to execute a plurality of software applications on the electronic device, each having corresponding graphical output specifications. The processor can be configured to execute a display control module resident in an operating system. The display control module can be configured to maintain an application data structure to store the corresponding graphical output specifications of each of the plurality of software applications. The display control module can also be configured to maintain a display capability data structure to store a plurality of settings for each of the variable display parameters. In response to one of the plurality of software applications being launched, the display control module can also be configured to process data stored in the application data structure and the display capability data structure to generate a set of display parameter settings to output to the display module for use in outputting graphical output from the launched application.

In some implementations, the plurality of variable display parameters can include at least one of: color gamut, bit depth, frame rate, and maximum brightness level. In some implementations, the display control module is configured to obtain the set of display parameter settings based in part on a current battery level of the electronic device. In some implementations, the display control module is configured to obtain the set of display parameter settings based in part on a display preference user input. In some implementations, the display control module is configured to obtain the set of display parameter settings based in part on ambient light data.

In some implementations, the display control module is configured to process data stored in the application data structure and the display capability data structure by selecting an operating mode having a plurality of associated display parameter settings. In some implementations, the application data structure includes a minimum value and a preferred value for each of the graphical output specifications. In some implementations, the display control module is configured to select the maximum value from the display capability data structure when the preferred value from a corresponding entry in the application data structure exceeds the maximum value from the display capability data structure.

In some implementations, the electronic device also includes a second processor configured to process image data and a memory device configured to communicate with the processor. In some implementations, the electronic device also includes a driver circuit configured to send at least one signal to the display and a controller configured to send at least a portion of the image data to the driver circuit. In some implementations, the electronic device also includes an image source module configured to send the image data to the processor. The image source module can include a receiver, a transceiver, or a transmitter. In some implementations, the electronic device can also include an input device configured to receive input data and to communicate the input data to the processor.

Another innovative aspect of the subject matter described in this disclosure can be implemented in a method of determining display parameter settings for display of graphical output from an application. The method includes maintaining, by a display control module resident in an operating system executing on a processor, an application data structure that stores the corresponding graphical output specifications of a plurality of software applications executable by the processor. The method includes maintaining, by the display control module, a display capability data structure that stores a plurality of variable display parameters and a plurality of settings for each of the variable display parameters, based on the capabilities of a display module coupled to the processor. The method includes selecting, by a display control module responsive to one of the plurality of software applications being launched, a set of display parameter settings for use in outputting graphical information from the launched application based on data stored in the application data structure and the display capability data structure. The method includes transmitting, by the processor, the selected set of display parameter settings to the display module. In some implementations, maintaining the display capability data structure includes maintaining values for color gamut, bit depth, frame rate, or maximum brightness level.

In some implementations, selecting the set of display parameter settings is based on a current battery level of a battery electrically coupled to the display module. In some implementations, selecting the set of display parameter settings is further based on ambient light data.

In some implementations, the method includes processing data stored in the application data structure and the display capability data structure to select an operating mode having a plurality of associated display parameter settings.

Another innovative aspect of the subject matter described in this disclosure can be implemented in an electronic device. The electronic device can include means for maintaining an application data structure that stores the corresponding graphical output specifications of a plurality of software applications executable by the processor. The electronic device can include means for maintaining a display capability data structure that stores a plurality of variable display parameters and a plurality of settings for each of the variable display parameters, based on the capabilities of a display module coupled to the processor. The electronic device can include means for selecting a set of display parameter settings for use in outputting graphical information from the launched application based on data stored in the application data structure and the display capability data structure. The electronic device can include means for transmitting the selected set of display parameter settings to the display module. In some implementations, the variable display parameters can include color gamut, bit depth, frame rate, or maximum brightness level.

In some implementations, the electronic device can include means for obtaining the set of display parameter settings based on a current battery level of the electronic device. In some implementations, the electronic device can include means for selecting an operating mode having a plurality of associated display parameter settings. In some implementations, the electronic device can include means for selecting the set of display parameter settings based on ambient light data.

Another innovative aspect of the subject matter described in this disclosure can be implemented in a non-transitory computer readable medium having instructions encoded thereon which, when executed by a processor, cause the processor to perform a method of determining display parameter settings for display of graphical output from an application. The method includes maintaining, by a display control module resident in an operating system executing on a processor, an application data structure that stores the corresponding graphical output specifications of a plurality of software applications executable by the processor. The method includes maintaining, by the display control module, a display capability data structure that stores a plurality of variable display parameters and a plurality of settings for each of the variable display parameters, based on the capabilities of a display module coupled to the processor. The method includes selecting, by a display control module responsive to one of the plurality of software applications being launched, a set of display parameter settings for use in outputting graphical information from the launched application based on data stored in the application data structure and the display capability data structure. The method includes transmitting, by the processor, the selected set of display parameter settings to the display module. In some implementations, maintaining the display capability data structure includes maintaining values for color gamut, bit depth, frame rate, or maximum brightness level.

In some implementations, the instructions encoded on the non-transitory computer readable medium cause the processor to select the set of display parameter settings based on a current battery level of a battery electrically coupled to the display module. In some implementations, selecting the set of display parameter settings is further based on ambient light data.

In some implementations, the instructions encoded on the non-transitory computer readable medium cause the processor to process data stored in the application data structure and the display capability data structure. Processing the data includes selecting an operating mode having a plurality of associated display parameter settings.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCD), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 2B shows a cross sectional view of an example rolling actuator shutter-based light modulator.

FIG. 4 shows an example application data structure.

FIG. 5 shows an example display capability data structure.

FIG. 6 shows an example display mode data structure.

FIG. 10 shows a flow diagram of an alternative example process for transmitting display parameter settings to a display module.

DETAILED DESCRIPTION

Figure 1A:
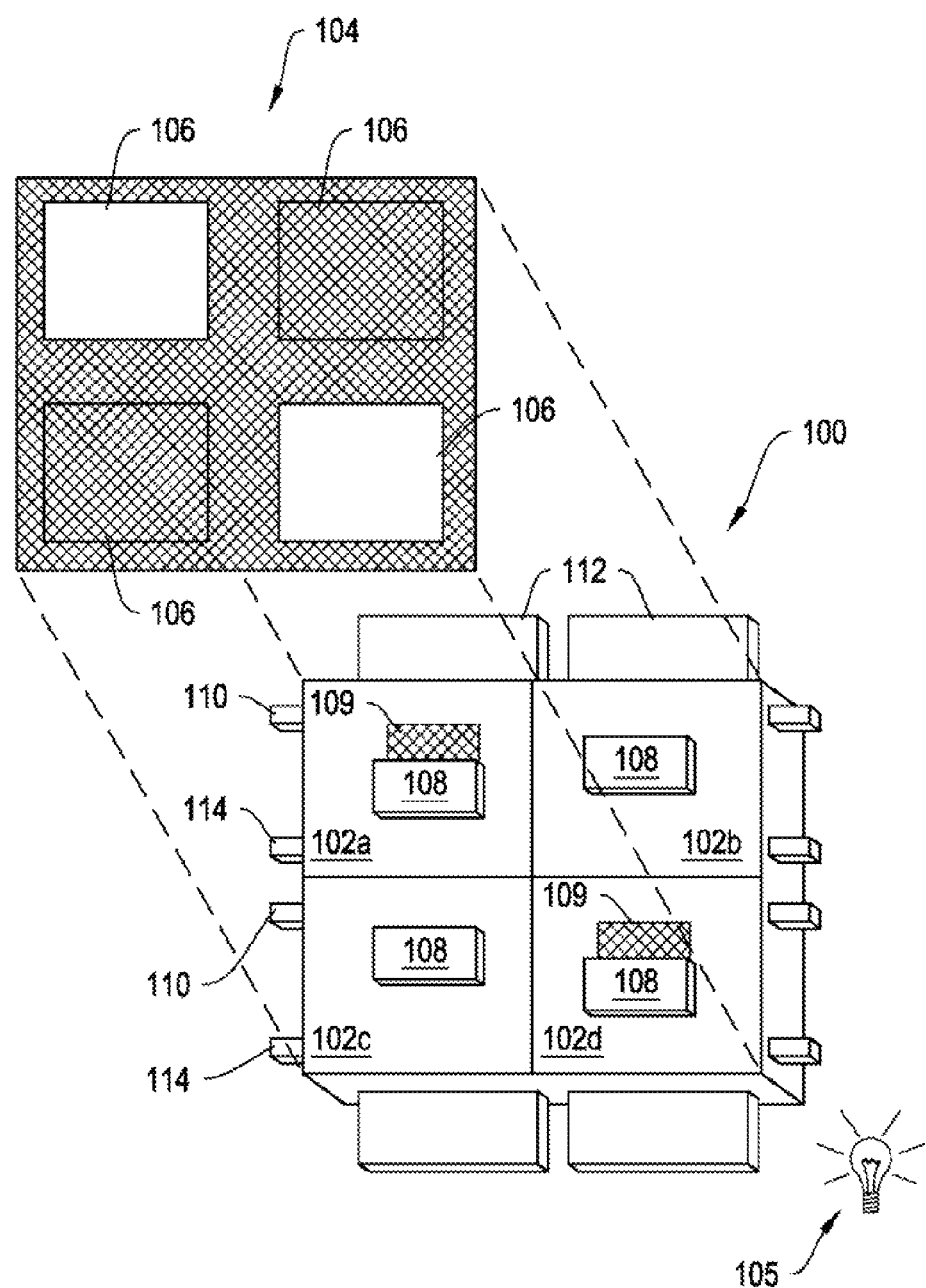
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such ase-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

To simplify the manufacturing process and improve display performance for many applications, a display control module can be incorporated into the operating system of a computing device. The display control module can have access to, or maintain, information on display module parameters stored in a data structure. For example, a computing device can include a data structure having information relating to the capabilities of an electronic display of the computing device. Such information can be stored in a display capability data structure on the device before the device is provided to a consumer. If the manufacturer later chooses to incorporate displays having different characteristics into subsequent versions of the computing device, the display capability data structure can easily be modified to reflect the updated display capabilities. Each manufactured computing device can therefore have an accurate record of its display capabilities.

Similarly, in some implementations, an application data structure can be stored on the computing device. The application data structure can contain information relating to the display preferences and requirements for each application that can execute on the computing device. For example, applications having a large amount of complex graphical output may require relatively high color bit depths, and this information can be incorporated into the application data structure. When an application is launched on the computing device, a processor of the computing device can reference the display capability data structure and the application data structure to determine a set of display parameters to be used by the electronic display. Thus, graphical performance can be optimized for each of the applications that may execute on the computing device.

Particular implementations of the subject matter described in this disclosure can be implemented to realize one or more of the following potential advantages. The display module parameter selection system disclosed herein allows a computing device to adapt to the varying needs of different software applications that may execute on the computing device. For example, by storing information corresponding to the display preferences for each executable application, the computing device is able to adjust its display characteristics when an application is launched, so that the graphical content for each application can be displayed to a user according to at least its minimum display requirements, and in some cases its preferred display parameters. In addition, the display preferences for an application can be edited in response to a change in the display preferences for the application, for example due to a software update. Thus, the display preference information for each application can be kept current readily.

In some implementations, the manufacturing process for computing devices having electronic displays is simplified without sacrificing the ability to adapt to the different display characteristics of various applications, as described above. For example, the computing device can store information corresponding to the display capabilities of its display device. This information can be stored during the manufacturing process. If the manufacturer later decides to use a display device having different display characteristics, the display capabilities information can be modified. Therefore, all of the manufactured devices can include accurate information relating to their display capabilities, despite the fact that the capabilities may differ on some of the devices. The display capabilities information can be stored in a programmable memory device associated with the display so that it can be easily modified even after the product is sold to a consumer. For example, if the manufacturer updates the firmware associated with the display device, thereby altering its display characteristics, the display capability information can also be adjusted accordingly.

The display parameter selection system and methods disclosed herein also frees application developers from needing to know the capabilities of the displays incorporated into the computing devices for which they are developing applications. Since the display control module of the computing device is able to discern the minimum and/or preferred display parameters for the application, the display control module can adjust the display parameters of the display to adapt to the needs of the application.

In some implementations, the display control module can also adjust the display parameters to account for other factors, such as ambient light levels, power consumption requirements, etc., based on information available to the operating system. For example, the display control module can receive information corresponding to the ambient light level of the area surrounding the display from an ambient light sensor in the computing device. If it is determined that the ambient light level is high, the maximum brightness level of the display can be increased to compensate. Similarly, the maximum brightness level of the display can be reduced in low-light environments. The computing device can also determine that it is powered by a battery having limited power capacity. In order to prolong the life of the device, the display control module can alter the display settings to reduce power consumption. For example, a lower frame rate or a lower maximum brightness level can be selected in such circumstances.

FIG. 1A shows a schematic diagram of an example direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
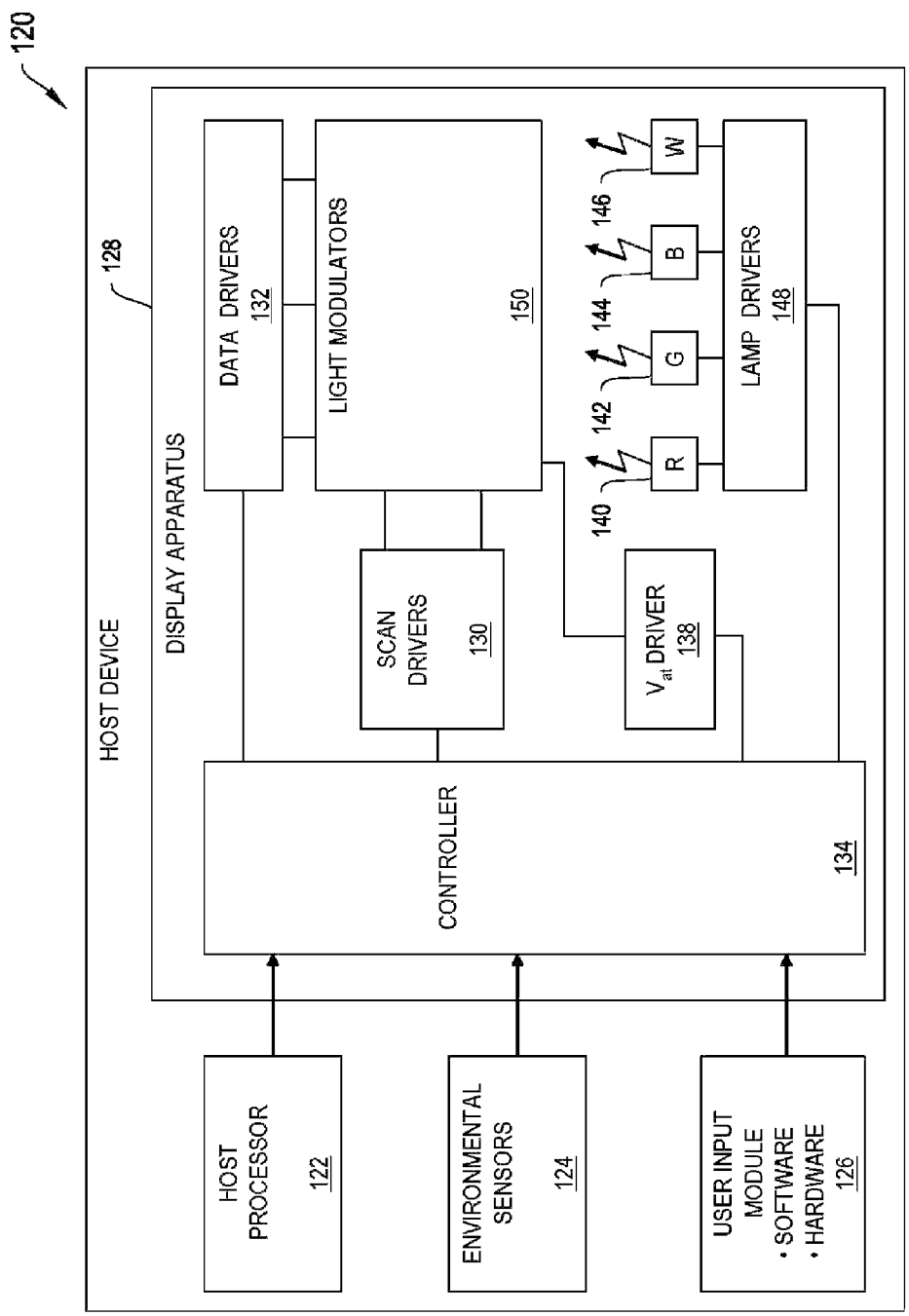
FIG. 1B shows a block diagram of an example host device.

FIG. 1B shows a block diagram of an example host device 120 (i.e., cell phone, smart phone, PDA, MP3 player, tablet, e-reader, netbook, notebook, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (such as scan drivers 130, data drivers 132 and common drivers 138) for different display functions are time-synchronized by the controller 134. Timing commands from the controller coordinate the illumination of red, green and blue and white lamps 140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from about 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

In some implementations the functionality of the controller 134 is divided between a microprocessor and a display controller integrated circuit. In some implementations, the display controller integrated circuit is implemented in an integrated circuit logic device, such as an application specific integrated circuit (ASIC). In some implementations, the microprocessor is configured to carry out all or substantially all of the image processing functionality of the controller 134, as well as determining an appropriate output sequence for the display apparatus 128 to use to generate received images. For example, the microprocessor can be configured to convert image frames included in the received image data into a set of image subframes. Each image subframe is associated with a color and a weight, and includes desired states of each of the display elements in the array 150 of display elements. The microprocessor can also be configured to determine the number of image subframes to display to produce a given image frame, the order in which the image subframes are to be displayed, and parameters associated with implementing the appropriate weight for each of the image subframes. These parameters may include, in various implementations, the duration for which each of the respective image subframes is to be illuminated and the intensity of such illumination. These parameters (e.g., the number of subframes, the order and timing of their output, and their weight implementation parameters for each subframe) can be collectively referred to as an "output sequence."

In contrast, the display controller integrated circuit can be configured primarily to carry out more routine operations of the display apparatus 128. The operations may include retrieving image subframes from a frame buffer and outputting control signals to the scan drivers 130, the data drivers 132, the common drivers 138, and the lamp drivers 148, in response to the retrieved image subframe and the output sequence determined by the microprocessor. The frame buffer can be any volatile or non-volatile integrated circuit memory, such as dynamic random access memory (DRAM), high-speed cache memory, or flash memory. In some other implementations, the display controller integrated circuit causes the frame buffer to output data signals directly to the various drivers 130, 132, 138, and 148.

In some other implementations, the functionality of the microprocessor and the display controller integrated circuit described above are combined into a single logic device such as the controller 134, which may take the form of a microprocessor, an ASIC, a field programmable gate array (FPGA) or other programmable logic device. In some other implementations, the functionality of the microprocessor and the display controller integrated circuit may be divided in other ways between multiple logic devices, including one or more microprocessors, ASICs, FPGAs, digital signal processors (DSPs) or other logic devices.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

As described further below, the host processor 122 can forward instructions to the microprocessor to adjust its output sequence. For example, based on such instructions, the microprocessor can output images using output sequences with fewer or more subframes per color or with a higher or lower frame rate. In addition, based on instructions from the host processor 122, the microprocessor can adjust the relative intensity of each light source (such as red lamp 140, green lamp 142, blue lamp 144, and white lamp 146) in generating each primary color. Doing so adjusts the saturation of each primary color in order for the display apparatus 128 to be able to reproduce various color gamuts or portions of various color gamuts.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
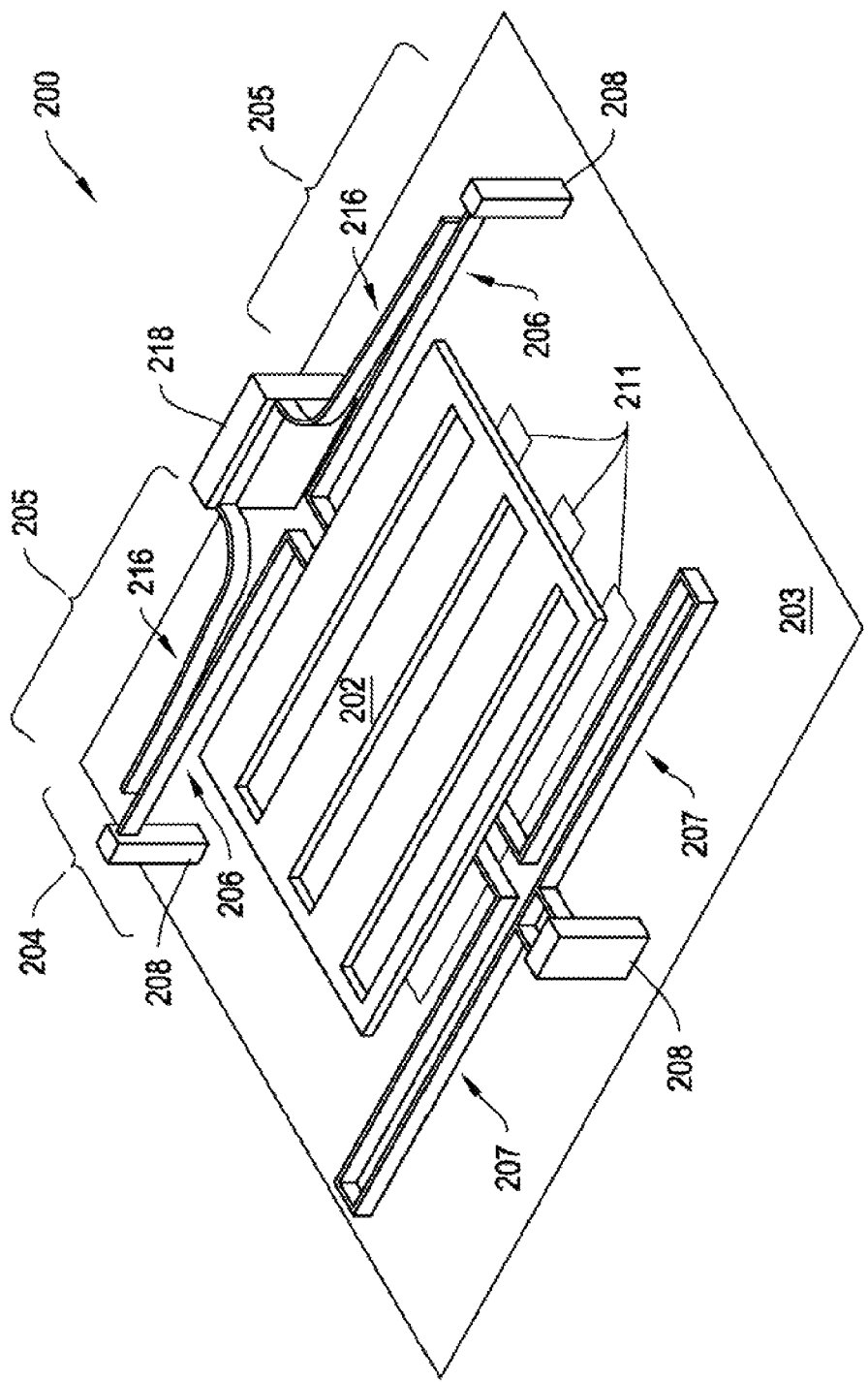
FIG. 2A shows a perspective view of an example shutter-based light modulator.

FIG. 2A shows a perspective view of an example shutter-based light modulator 200. The shutter-based light modulator 200 is suitable for incorporation into the direct-view MEMS-based display apparatus 100 shown in FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface 203 includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and a separate set of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

The display apparatus 100, in alternative implementations, includes display elements other than transverse shutter-based light modulators, such as the shutter assembly 200 described above. For example, FIG. 2B shows a cross sectional view of an example rolling actuator shutter-based light modulator 220. The rolling actuator shutter-based light modulator 220 is suitable for incorporation into an alternative implementation of the MEMS-based display apparatus 100 shown in FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

Figure 2C:
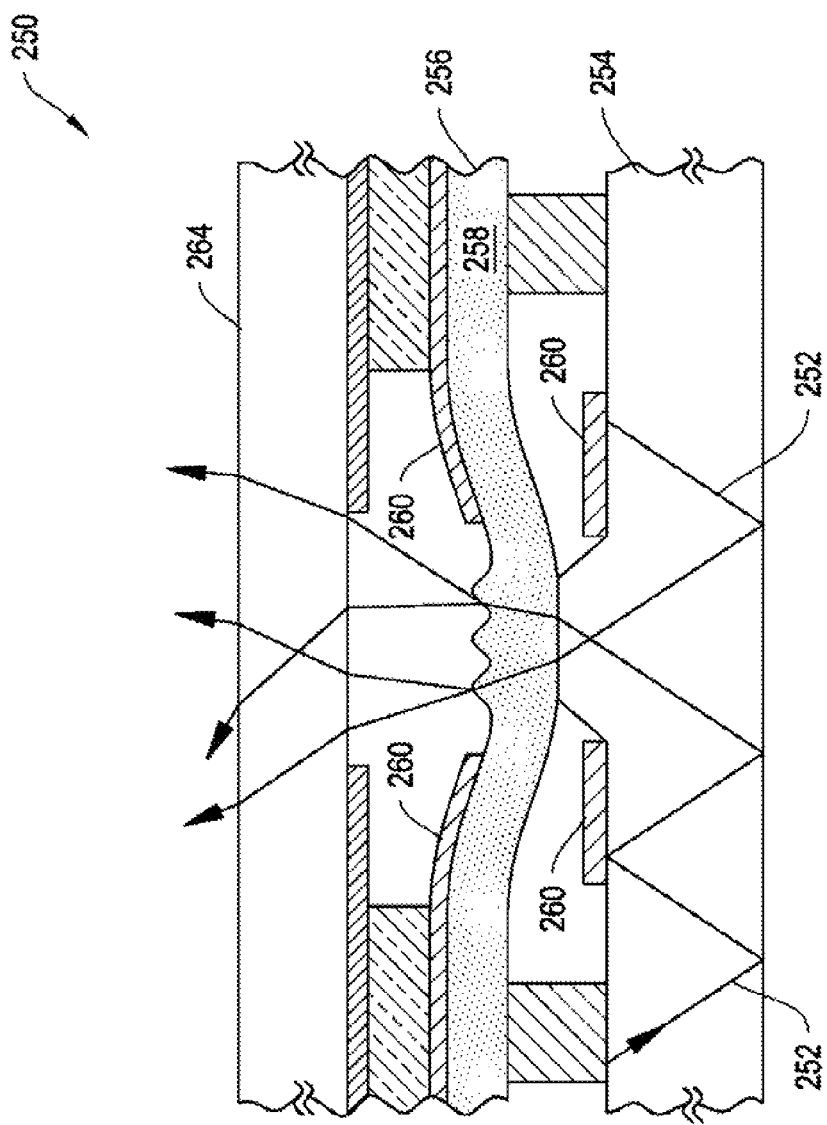
FIG. 2C shows a cross sectional view of an example non shutter-based MEMS light modulator.

FIG. 2C shows a cross sectional view of an example non shutter-based MEMS light modulator 250. The light tap modulator 250 is suitable for incorporation into an alternative implementation of the MEMS-based display apparatus 100 shown in FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
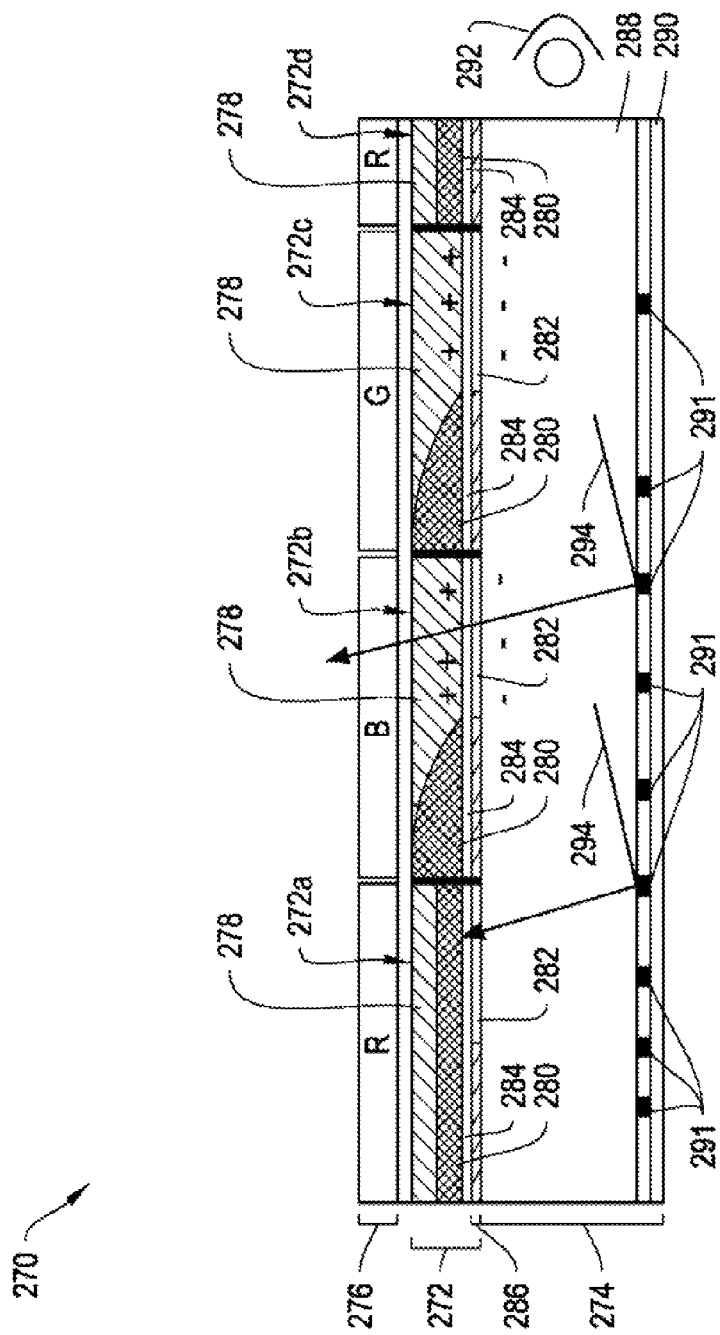
FIG. 2D shows a cross sectional view of an example electrowetting-based light modulation array.

FIG. 2D shows a cross sectional view of an example electrowetting-based light modulation array 270. The electrowetting-based light modulation array 270 is suitable for incorporation into an alternative implementation of the MEMS-based display apparatus 100 shown in FIG. 1A. The light modulation array 270 includes a plurality of electrowetting-based light modulation cells 272a-d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3:
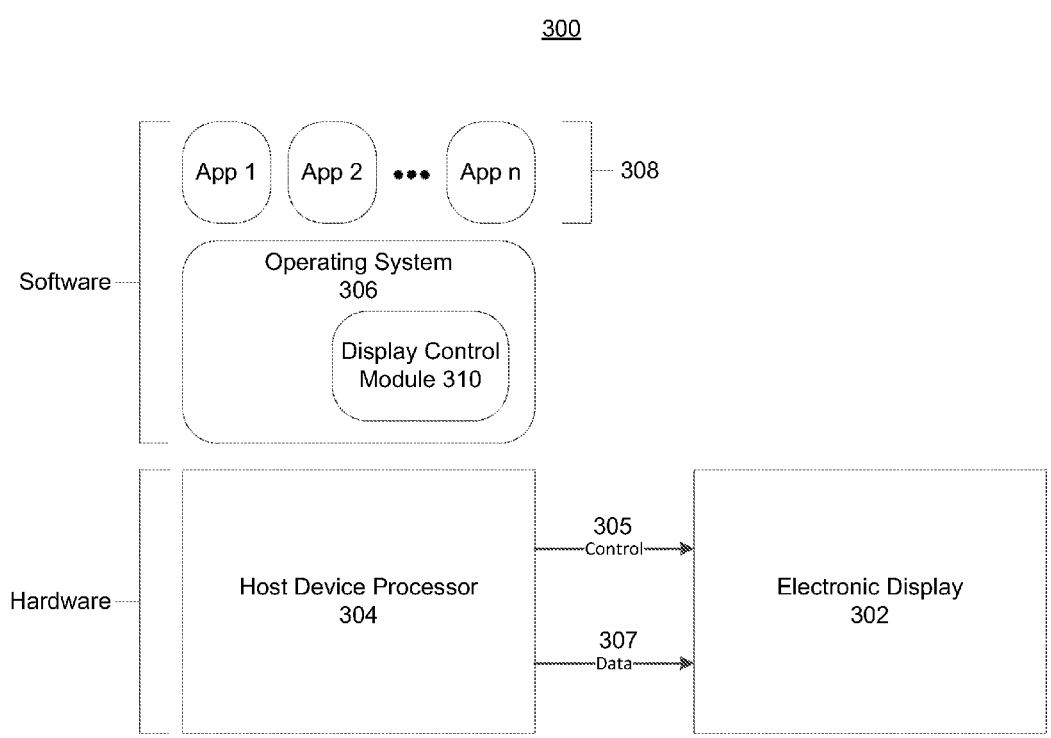
FIG. 3 shows a block diagram of an example display module parameter selection system.

FIG. 3 shows a block diagram of an example display module parameter selection system 300. The system 300 can be incorporated into a computing device, such as a smart phone, a tablet computer, a laptop computer, etc. The system 300 includes an electronic display 302 communicatively coupled to a host device processor 304. The system 300 also includes software components such as an operating system 306, a plurality of applications 308, and a display control module 310.

The electronic display 302 may be any of a variety of displays, including a digital or analog display, as described herein. The electronic display 302 can be or can include a flat-panel display, such as plasma, EMS, electroluminescent (EL) displays, OLED, super twisted nematic (STN) display, LCD, or thin-film transistor (TFT) LCD, or a non-flat-panel display. In addition, the electronic display 302 can include a mechanical light modulator-based display, as described herein.

The electronic display 302 can be controlled by the host device processor 304. A variety of display settings used by the electronic display 302 may be adjusted by the host device processor 304. For example, the electronic display 302 can operate using various combinations of frame rates, bit depths, color gamuts, or percentages of a color gamut. Other display parameters of the electronic display 302 may also be adjustable. As described above, the display parameters can be adjusted by a controller (such as the controller 134 shown in FIG. 1B) within the electronic display 302 adjusting the output sequence it uses to output subframes to an array of display elements (such as the light modulators 150, which are also shown in FIG. 1B). The controller can also adjust the intensities with which it illuminates light sources within the electronic display 302. The selection of a particular value for each display parameter to be applied to the electronic display 302 can be determined by the host device processor 304.

The host device processor 304 may be any type of electronic processor capable of controlling the electronic display 302. For example, the host device processor 304 may be a general purpose processor included in a laptop or desktop computer, smartphone, tablet computing device, or smart television module. The host device processor 304 may be a microcontroller, an FPGA, or any other type of logic device capable of executing computer instructions and communicating with the electronic display 302 to control the output characteristics of the electronic display 302. Control information 305, such as information corresponding to the desired output characteristics of the electronic display 302 can be transmitted from the host device processor 304 to the electronic display 302. Other data 307, such as the image data to be displayed, can also be transmitted from the host device processor 304 to the electronic display 302.

In some implementations, the host device processor 304 may be implemented as more than one processor. For example, the host device processor 304 may be implemented with multiple general purpose processors. The host device processor 304 may also be implemented with a general purpose processor in communication with a separate graphics processor. In some other implementations the host device processor 304 may be a single processor. For example, the host device processor 304 may be implemented with a single general purpose processor or a single graphics processor.

The software components of the system 300, such as the operating system 306, the applications 308, and the display control module 310 can be executed by the central processing unit 304. For example, the operating system 306 can be a commercially available computer operating system executing on a personal computer, such as the WINDOWS™ operating system produced by Microsoft Corporation of Redmond, Wash. or the OS X™ operating system produced by Apple Inc. of Cupertino, Calif. In other implementations, the operating system 306 can be an operating system suitable for use in mobile computing devices, such as the IOS™ operating system produced by Apple Inc. or the ANDROID™ operating system produced by Google Inc. of Mountain View, Calif. The operating system 306 can execute on computer hardware, such as the host device processor 304, and can allocate resources and provide services to any of the plurality of applications 308.

The applications 308 are computer programs executable by the host device processor 304. For example, the applications 308 can be installed on the computing device controlled by the host device processor 304. One of the applications 308 can be launched in response to a request by a user of the computing device. Each of the applications 308 can allow the user to interact with the inputs and/or outputs, such as the output of display 302, of the computing device in a particular fashion. For example, one of the applications 308 can provide a web browser interface to allow a user to view web pages, while another one of the applications 308 might provide video and image editing capabilities. Other examples of the applications 308 can include E-readers, email clients, games, text editors, file browsers, drawing programs, video and audio players, or any other type of computer program.

In some implementations, one or more of the applications 308 may be preinstalled on a computing device when the device is purchased by a customer. In other implementations, applications 308 may be installed subsequent to the purchase of the computing device. For example, applications 308 may be downloaded from third party application developers to the computing device via a computer network, such as the Internet. The downloaded applications can then be installed on the computing device. Applications 308 may also be developed independently by a user of the computing device. For example, the computing device itself can be used to develop an application, and the application can then be installed on the computing device.

There may be any number of applications 308 installed on a computing device, and each application 308 may have different display output requirements. For example, a graphics-intensive application 308, such as a three dimensional video game, may require a higher frame rate in order to provide the best possible experience for a user of the computing device. In this example, a refresh rate of about 120 Hz may be optimal. Such an application may be unusable at a relatively low frame rate, such as approximately 15 Hz. Other applications 308 may still perform acceptably at significantly lower frame rates. For example, an application having relatively little graphical content, such as an E-reader or text editor, may be viewed by a human user as performing substantially the same at a frame rate of about 15 Hz as at a much higher frame rate, such as a frame rate of approximately 120 Hz. Other applications 308 may have varying requirements for other display output parameters. For example, a photo editing application may require a large bit depth, while an email client may not. There may also be applications 308 executed by host device processor 304 that have no visual content, and therefore have no graphical display output requirements.

In some implementations, some or all of the applications 308 can be installed and executed on a remote computer rather than on the host device processor 304. For example, an application 308 may be a virtual application executed on by a separate processor but displayed on the electronic display 302. In this example, host device processor 304 does not execute the application 308, but still transmits image data from the application 308 to the electronic display 302. It is therefore important for the host device processor 304 to properly control the electronic display 302 to display graphical content for applications that may not be executed by the host device processor 304.

Applications 308 can be launched in response to a command from a user of the system 300. In some implementations, a user may wish to launch several of the applications 308 and execute the applications 308 simultaneously. For example, each application launched may be displayed in its own window on the electronic display 302. The concurrently executing applications can each have different display output preferences or requirements. In this example, the host device processor 304 can transmit the image data for all of the concurrently executing applications to the electronic display 302. The host device processor 304 can also control the display unit 302 to operate with output characteristics that are suitable for displaying all of the applications 308 simultaneously.

The aforementioned output characteristics can be determined by a display control module 310 resident within the operating system 306 executing on the electronic display 302. The display control module 310 can communicate with the applications 308, the remainder of the operating system 306, and the host device processor 304. For example, the display control module 310 can maintain information such as the display requirements of each application 308, as well as information indicating which, if any, of the applications 308 are currently executing on the processor 304. The display control module 310 can use information from the applications 308 to determine desired display output parameters for the electronic display 302, and can then cause the host device processor 304 to transmit (or communicate) the desired parameters to the electronic display 302.

The display control module 310 can also determine when it is desirable to alter the current display parameters of the electronic display 302. For example, the display control module 310 can continuously or periodically receive information about the applications 308 that are currently being executed by the processor 304. If an application 308 requiring a high frame rate is terminated, the display control module 310 can respond by transmitting to the host device processor 304 instructions to operate at a lower frame rate. The display control module 310 can also use other information to determine the desired operating parameters for the electronic display 302. For example, the display control module 310 can determine that reducing power consumption of the system 300 is a priority, and can respond by transmitting display parameter information to the host device processor 304 that will allow the system 300 to consume less power while displaying graphical content from the applications 308, such as a lower frame rate or reduced maximum brightness levels.

FIG. 4 shows an example application data structure 400. The application data structure 400 includes information corresponding to at least some of the applications that can be executed by the host device processor 304 and displayed by the electronic display 302 shown in FIG. 3. For example, the application data structure 400 contains identification information 402 for each application. For each application identified by identification information 402, the application data structure 400 also includes minimum and preferred values for a plurality of display parameters 404.

The identification information 402 can include an application name, an application type, or any other form of information identifying each application that can be displayed. For example, application data structure 400 can include identification information 402 identifying applications such as a web browser, an E-reader, a mapping application, or a video game. The application data structure 400 is illustrative only, and could be modified to include identification information 402 for any number of different applications.

The application data structure 400 also includes display parameter information 404 for each application identified by application identification information 402. For example, display parameters 404 can include a refresh rate, a bit depth, or a color gamut percentage. Each parameter 404 can have multiple associated values. For example, an application may have a minimum required value as well as a preferred value for each display parameter 404. In some implementations, the application data structure 400 only stores minimum required values.

The values for each parameter 404 can be selected based on the graphical content of the associated application. For example, a mapping application might be expected to display a large amount of graphical content, including high resolution satellite photos. It may therefore be preferable for such an application to have a relatively large bit depth in order to accurately represent photo images. Other applications may have different display parameters 404. For example, an E-reader or text editor may display primarily black and white colors, and thus may require a significantly smaller color gamut than other applications. Some applications may also have minimum requirements for display parameters 404. For example, a video game application may not be usable if the refresh rate of the display is below a threshold frame rate, such as 30 frames per second.

In some implementations, the application data structure 400 can be modified over time. For example, a computing device may allow a user to install and remove applications at will. Data in the application data structure 400 can be updated to account for the installation and removal of applications, for example by adding a row corresponding to a newly installed application. Identification information 402 and display parameters 404 for the new application can be recorded in the data structure 400. When an application is removed from a computing device, its identification information 402 and display parameters 404 can be deleted from the data structure 400.

The application data structure 400 can also include identification information for applications that are not installed on the computing device, such as virtual applications. For example, if the computing device is authorized to access a remotely hosted virtual application, the application data structure 400 can be modified to include identification information 402 and associated display parameters 404 for the virtual application. When the computing device no longer has access to the virtual application, its identification information 402 and display parameters 404 can be removed from the data structure 400.

Other modifications to the application data structure 400 may also be possible. Identification information 402 and display parameters 404 may be stored in the data structure 400 when an application is installed. For example, this information may be provided by the developer of the application at the time the application is installed. However, if the display requirements for the application change, for example, in response to an update to the application software, the display parameters 404 for the application may be modified. In some implementations, some or all of the display parameters 404 in the application data structure 400 can be modified by a user of the computing device. In some implementations, the electronic display 302 shown in FIG. 3 can determine the minimum or preferred display parameter values for an application. For example, the electronic display 302 shown in FIG. 3 can receive graphical output data from an application during execution of the application. The electronic display 302 shown in FIG. 3 can then determine a set of appropriate display parameter values based on the graphical output data.

In another example, display parameters 404 for a previously installed application may be changed when the application is updated. For instance, an application that displayed only textual content when it was first installed can be updated to also display video content. The display parameters 404 for the updated application can then be changed to improve the display of video content in the updated application, such as by increasing the display parameter 404 corresponding to a preferred frame rate.

FIG. 5 shows an example display capability data structure 500. The display capability data structure 500 includes a plurality of display parameters 502. For each display parameter 502, the display capability data structure 500 includes one or more capability values 504.

The display parameters 502 represent the various characteristics that can be adjusted to change the appearance of a displayed image or the way in which images and video are rendered on an electronic display. For example, display parameters 502 can include refresh rate, color bit depth, color gamut, maximum brightness levels, or any other adjustable display setting or characteristic. The display capability data structure 500 can include any number of display parameters 502. In some implementations, some or all of the display parameters 502 can correspond to the display parameters 402 of the application data structure 400 shown in FIG. 4.

For each display parameter 502, the display capability data structure 500 also includes capability values 504 representing the specific values that the display is able to implement. For example, a display may have a maximum frame rate of about 60 Hz, but may also operate at a frame rate of about 30 Hz, 24 Hz, or 1 Hz. There may be intermediate values, such as about 16 Hz, for example, at which the display is not capable of operating, and these intermediate values will not be present in the display capability data structure 500. In some implementations, the display parameters 502 and the capabilities values 504 can be permanent. In other implementations, it may be possible to modify some or all of the values in the display capability data structure 500, for example in response to a firmware update impacting the performance of the display.

In some implementations, the display parameters 502 and capability values 504 in the display capability data structure 500 may be set when the display is manufactured. For example, a computing device including a display can have a display capability data structure 500 included when the computing device is assembled. If the manufacturer later chooses to produce the device with a different display, such as a display from a different vendor or an updated version of an earlier display, the display capability data structure 500 on the later devices can be altered to account for any changes in the abilities of the updated display. The manufacturing process can be simplified because applications do not need to be rewritten for these changes and the operating system of each device produced will have access to an accurate display capability data structure 500 from the time the device is manufactured.

FIG. 6 shows an example display mode data structure 600. The display mode data structure 600 includes one or more display modes 602. For each display mode 602, the display mode data structure includes values for one or more display parameters 604. In some implementations, some or all of the display parameters 604 can correspond to the display parameters 402 of the application data structure 400 shown in FIG. 4, or the display parameters 502 of the display capability data structure 500 shown in FIG. 5.

The display modes 602 can correspond to various priorities or display performance objectives of the computing device. For example, a power save mode 602 and its associated display parameters 604 can represent the display operating characteristics that should be implemented by the display when conserving power is a priority. Such a mode may be useful if the computing device is not plugged into a wall outlet or other power supply, or if an internal battery of the computing device is insufficiently charged. In this example, the display parameter 602 corresponding to frame rate or maximum brightness level may have a low value, which can allow the display to operate in a manner that reduces power consumption.

In another example, the display mode data structure 600 can have a display mode 602 that is particularly suited for video playback. High quality video is a priority in this mode, and the display parameters 604 can be selected accordingly. For example, a high frame rate and large bit depth can be used to improve the appearance of displayed video content.

In some implementations, the display mode data structure 600 can be modified. For example, a user of a computing device may have unique preferences for the characteristics of the display. The user can therefore create a custom display mode 602 and corresponding values for the display parameters 604, all of which can be stored in the display mode data structure 600. Any number of such custom display modes 602 can be added to the data structure 600. A user may also delete display modes 602 and their corresponding display parameters 604 from the display mode data structure 600.

Figure 7:
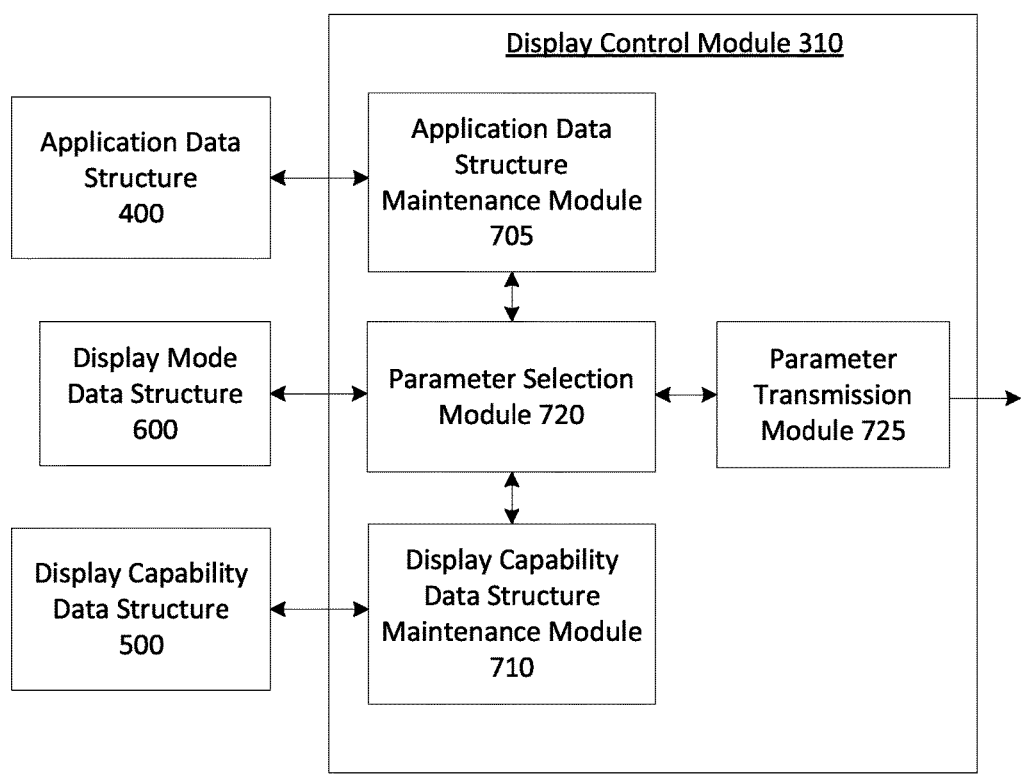
FIG. 7 shows a block diagram of the display control module 310 shown in FIG. 3.

FIG. 7 shows a block diagram of the display control module 310 shown in FIG. 3. The display control module 310 has access to the application data structure 400 shown in FIG. 4, the display capability data structure 500 shown in FIG. 5, and the display mode data structure 600 shown in FIG. 6. The display control module 310 includes an application data structure maintenance module 705, a display capability data structure maintenance module 710, a parameter selection module 720, and a parameter transmission module 725.

The application data structure maintenance module 705 is configured to ensure that the application data structure 400 is accurate and complete. For example, the application data structure maintenance module 705 can monitor the applications that are installed on the computing device. When an application is uninstalled from the computing device, or when the computing device no longer has access to a virtual application, the application data structure maintenance module 705 can delete the corresponding information from the application data structure 400. When a new application is installed, the application data structure maintenance module 705 can populate the application data structure 400 with identification and display parameter information for the newly installed application. In some implementations, the application data structure maintenance module 705 can retrieve such information from the application itself, and can store the information in the application data structure 400. For example, the application can include a file provided by its developers that indicates the preferred and minimum values for a plurality of display parameters. In some implementations, such a file is included along with the installed application. In some other implementations, the application data structure maintenance module 705 queries a remote server operated by the application developer or another party which maintains a database or other data structure associating applications with their respective required and/or preferred display parameters. In some other implementations, the application data structure maintenance module 705 can identify minimum and/or preferred display parameters for an application by analyzing the graphical output of the application. In other implementations, the application data structure maintenance module 705 can determine that the newly installed application is of a certain category, such as video games or text editors, and can populate the application data structure 400 with display parameter values that are typical for other applications belonging to that category.

Similarly, the display capability data structure maintenance module 710 can maintain the display capability data structure 500 in a complete and accurate state. For example, the display capability data structure maintenance module 710 can monitor changes to the operating capabilities of the display, such as changes that become effective following a firmware update to the display. The display capability data structure maintenance module 710 can then remove older, inaccurate information from the display capability data structure 400 and can add the updated information as appropriate.

The parameter selection module 720 can interact with all of the other components of the display control module 310 to determine a set of display parameters to be used by the electronic display. For example, the parameter selection module 720 can receive inputs from the application data structure 400, the display capability data structure 500, the display mode data structure 600 and the operating system 306 shown in FIG. 3. In some implementations, the parameter selection module 720 may communicate directly with the application data structure 400 or the display capability data structure 500. For example, the parameter selection module 720 can read information from the application data structure 400 or the display capability data structure 500, or can request such information from the data structures themselves and await a response containing the desired information. In other implementations, the parameter selection module 720 can receive information from the application data structure 400 and the display capability data structure 500 via the application data structure maintenance module 705 and the display capability data structure maintenance module 710, respectively.

In one implementation, the parameter selection module 720 can determine that a user has launched an application on the computing device. The parameter selection module 720 can identify the launched application, and retrieve information from the corresponding entry in the application data structure 400 to determine the preferred display settings for the application. In some implementations, the parameter selection module 720 can select the preferred display parameters.

The parameter selection module 720 can also use other factors to select display parameters. For example, the parameter selection module 720 can receive information corresponding to an ambient light level in the environment surrounding the electronic display. Because ambient light can impact the quality of displayed images, the parameter selection module 720 can use the ambient light information to improve the selection of display parameters. In one example, the display can be in a very bright environment, such as outdoors on a sunny day. The parameter selection module 720 can select a relatively high value for the maximum display brightness, so that the displayed images will be more visible to the user and will not be washed out by the sunlight. Similarly, the parameter selection module 720 can select a lower bit depth in response to a high ambient light level, because a viewer will not be able to perceive the fine distinctions associated with a higher bit depth under bright lighting conditions. Alternatively, if the parameter selection module 720 determines that the display is located in a dark environment, the parameter selection module 720 can select a relatively low maximum brightness level. The parameter selection module 720 can also select a higher bit depth in response to a low ambient light level, because the fine distinctions associated with a higher bit depth will be more easily perceived by a viewer under dim lighting conditions. Thus, in some implementations, the parameter selection module 720 can help to improve the quality of displayed images by selecting parameter values that differ from the preferred values in the application data structure 400.

The parameter selection module 720 can also receive information regarding the power source, power level, or power consumption and/or power of the computing device. For example, the parameter selection module 720 can determine whether the computing device is electrically connected to a wall outlet or is instead being powered by a battery. The parameter selection module 720 can also determine the remaining battery life. If the battery life is determined to be low, the parameter selection module 720 can select display parameters that will lengthen the expected battery life of the computing device, such as a lower frame rate, for example. Such values may be selected even if they are lower than the preferred values stored in the application data structure. In some implementations, the parameter selection module 720 can ensure that the selected parameters are not lower than the minimum values stored in the application data structure for each application that is currently executing on the computing machine.

In some implementations, the parameter selection module 720 can select a new set of display parameters without first receiving a request to launch a new application. For example, there may be more than one application executing simultaneously on the computing device. The parameter selection module 720 can communicate with the operating system 306 shown in FIG. 3 to determine which application is active at a given time. Parameter selection can then be accomplished according to the preferred parameter values for the active application. If the user changes the active application, the parameter selection module 720 can select parameters based on the newly active application. In other implementations, the parameter selection module 720 can compare the preferred parameter values for all of the concurrently executing applications, and can select parameter values based on the maximum of the preferred values in the application data structure 400. In this way, the parameter selection module 720 can ensure that the display is optimized for all of the concurrently executing applications, so that changes to the display parameters may be made less frequently.

In another example, an application may have several different uses, each of which requires a different level of graphical complexity. For example, a web browser can be used to read text-based content, listen to audio, or watch video. When such an application is executing, the parameter selection module 720 can determine which function the application is serving in real time, and can update the display parameters accordingly. For example, the parameter selection module 720 may select a relatively low value for a frame rate when a web browser is being used to display text. The parameter selection module 720 may then determine that the user has navigated to a different web page having video content, and can respond by selecting a higher frame rate to better display the video.

The parameter selection module 720 can also use information from the display mode data structure 600 shown in FIG. 6 to select display parameters. For example, a user can store his or her own display preferences in the display mode data structure 600 shown in FIG. 6, as discussed above in connection with FIG. 6. Subsequently, the user can indicate a desire for images to be displayed according to the custom display mode, and the parameter selection module 720 can select the corresponding display parameters from the display mode data structure 600 shown in FIG. 6.

In some implementations, the parameter selection module 720 can select parameters from the display mode data structure 600 shown in FIG. 6 in the absence of user input. For example, the parameter selection module 720 can determine that the computing device has a low level of battery life remaining, and can select the parameters corresponding to a power save mode from the display mode data structure 600 shown in FIG. 6 in order to prolong battery life.

The parameter selection module 720 may also select a subset of the parameters associated with a display mode in the display mode data structure 600 shown in FIG. 6. For example, it the parameter selection module 720 determines that it is desirable to conserve power, the parameter selection module 720 can select one value associated with the power save mode, such as a reduced frame rate of 60 Hz, but may also select values other than those associated with the power save mode, such as a high maximum brightness level. The parameter selection module 720 can therefore select parameter values to serve more than one priority simultaneously.

In some other implementations, the parameter selection module 720 can select parameters for an application for which little to no information is stored in the application data structure 400 by using the display mode data structure 600 shown in FIG. 6. For example, if the parameter selection module 720 has information indicating a category, such as video application, graphic intensive game, office application, etc., into which the launched application fits, the parameter selection module 720 can select parameter values from a corresponding display mode in the display mode data structure 600 associated with that category.

Information from any or all of the components in the display control module 310 may be combined by the parameter selection module 720 in determining the values for display parameters. For example, the parameter selection module 720 can determine that an application has been launched, and can refer to the application data structure 400 to determine the display parameter preferences for the launched application. Then, the parameter selection module 720 can refer to the display capability data structure 500 to compare the preferred values for the launched application to the values that the display is capable of implementing. If a preferred parameter value cannot be implemented by the display (i.e., the preferred value is absent from the display capability data structure 500), the parameter selection module 720 can instead choose a value that is present in the display capability data structure 500. In one example, the parameter selection module 720 can select the value from the display capability data structure 500 that is closest to the preferred value. In another example, the parameter selection module 720 can select the value from the display capability data structure 500 that is closest to the preferred value but is not less than the preferred value.

In some implementations, the minimum value for a parameter in the application data structure 400 may be greater than the greatest value in the display capability data structure 500. In such cases, the parameter selection module 720 may select the greatest value from the display capability data structure 500. Alternatively, the parameter selection module 720 may warn the user, for example by displaying a popup dialog window, that the display is incapable of operating at a minimum level required by the launched application. The user may then indicate whether to attempt to execute the application despite the limitations of the display, or to halt execution of the application.

The display control module 310 also includes a parameter transmission module 725. The parameter transmission module 725 can send the selected display parameters to the host device processor 304 shown in FIG. 3. After the parameter selection module 720 has determined a set of display parameters to be used by the electronic display 302 shown in FIG. 3, the parameter selection module 720 can send the selected parameters to the parameter transmission module 725. The parameter transmission module 725 can then transmit the selected parameters to the host device processor 304 shown in FIG. 3, which can subsequently transmit the selecting parameters to the electronic display 302 shown in FIG. 3.

Figure 8:
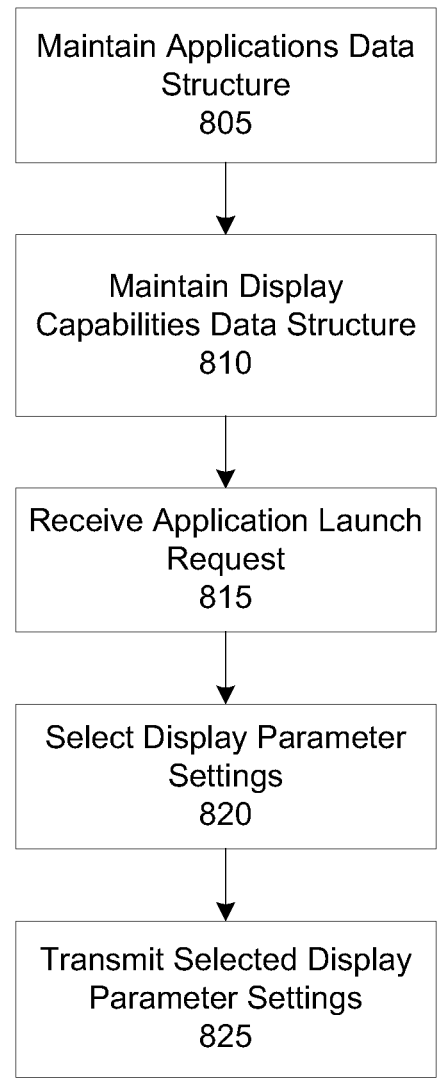
FIG. 8 shows a flow diagram of an example process for transmitting display parameter settings to a display module.

FIG. 8 shows a flow diagram of an example process 800 for transmitting display parameter settings to a display module. In some implementations, the process 800 can be performed by a display control module in communication with the display, such as the display control module 310 shown in FIG. 3. The process 800 includes maintaining an application data structure (stage 805), maintaining a display capability data structure (stage 810), receiving an application launch request (stage 815), selecting display parameter settings (stage 820), and transmitting the selected display parameter settings (stage 825).

The process 800 includes maintaining an application data structure (stage 805). As discussed above in connection with the FIG. 4, an application data structure such as the application data structure 400 shown in FIG. 4 can include information about some or all of the applications capable of executing on a computing device. For example, the application data structure 400 shown in FIG. 4 can include identification information for each application. Each identified application can also have information relating to the display parameters to be used when the application is executed. Display parameters can be any type of adjustable display operating characteristic, such as a frame rate, bit depth, or color gamut. In some implementations, the application data structure 400 shown in FIG. 4 can include minimum and preferred values for each display parameter associated with an application.

In some implementations, maintaining (stage 805) the application data structure includes populating the data structure with information corresponding to newly installed applications, removing information from the data structure when an application is no longer available to a computing device, and ensuring the information in the application data structure 400 shown in FIG. 4 remains accurate and complete. In some implementations, the information to be included for a given application in the application data structure 400 shown in FIG. 4 can be provided by the developers of the application. For example, developers of an application may include a file with the application indicating minimum and preferred values for a plurality of display parameters, and these values may be added to the application data structure 400 shown in FIG. 4 when the application is installed.

The application data structure 400 shown in FIG. 4 can also include identification information for applications that are not installed on the computing device, such as virtual applications. For example, if the computing device may be capable of accessing applications that are executed by a remote computer. Although such an application is not installed locally, its graphical output still can be displayed locally. Therefore, maintaining (stage 805) the application data structure 400 shown in FIG. 4 can include populating the application data structure with information corresponding to the display parameters associated with a virtual application. Such information can be removed from the application data structure 400 shown in FIG. 4 when the computing device no longer has access to the virtual application. In some implementations, maintaining (stage 805) the application data structure 400 shown in FIG. 4 can be accomplished by, for example, the application data structure maintenance module 705 shown in FIG. 7.

In some implementations, maintaining the application data structure 400 shown in FIG. 4 (stage 805) includes adjusting values in the application data structure 400 shown in FIG. 4 in response to an update of one of the applications executable by the computing device. For example, a previously installed application may receive a software update after the application has been installed on the computing device. Some such updates may impact the graphical output of the application, such as by adding video content or by displaying graphics at a higher resolution than earlier versions of the application. Therefore, the application data structure 400 shown in FIG. 4 can be maintained (stage 805) after a software update by updating the display parameters associated with newly updated applications.

The process 800 also includes maintaining a display capability data structure (stage 810). As discussed above in connection with the FIG. 5, a display capability data structure such as the display capability data structure 500 shown in FIG. 5 can include information relating to the display capabilities of an electronic display. For example, the display may have a number of adjustable display parameters, such as frame rates, color gamuts, maximum brightness levels, and color bit depths. The display may be capable of operating at a number of discrete values with respect to each parameter. In some implementations, the display capability data structure 500 shown in FIG. 5 can be populated as part of the manufacturing process for a computing device, so that the display capability data structure 500 shown in FIG. 5 is up to date as soon as each device is produced.

Maintaining (stage 810) the display capability data structure 500 shown in FIG. 5 can include updating the display capability data structure 500 shown in FIG. 5 in response to changes in the operating abilities of the display. For example, an update to the firmware or software associated with the display can alter its operating characteristics. The new information can then be added to the display capability data structure to ensure the information in the display capability data structure remains accurate and complete. In some implementations, maintaining (stage 810) the display capability data structure 500 shown in FIG. 5 can be accomplished by, for example, the display capability data structure maintenance module 710 shown in FIG. 7.

The process 800 also includes receiving an application launch request (stage 815). An application can be launched by a user or by another application. For example, a user of the computing device can launch an application, by selecting an icon associated with the application in a graphical user interface, by entering a text-based command, or by voice. The request to launch an application can be received, for example, by the parameter selection module 720 shown in FIG. 7. In some implementations, the operating system of the computing device can maintain, or have access to, a list of applications that are executing on the computing device. The parameter selection module 720 shown in FIG. 7 can periodically query the operating system to determine which applications are running. An application that was previously inactive can be determined by the parameter selection module 720 shown in FIG. 7 to be running, and this determination can correspond to a launch request. In another example, the operating system can notify the parameter selection module 720 shown in FIG. 7 when the operating system receives the application launch request.

The process 800 also includes selecting display parameter settings (stage 820). A number of factors can contribute to the selection of the display parameter settings, including information from the application data structure 400 shown in FIG. 4 and the display capability data structure 500 shown in FIG. 5. The process by which display parameters are selected (stage 820) is described more fully below in connection with FIG. 9, as well as above in connection with FIG. 7.

The process 800 also includes transmitting the selected display parameter settings (stage 825). In some implementations, the selected display parameter settings can be transmitted to a processor such as the host device processor 304 shown in FIG. 3. The host device processor 304 shown in FIG. 3 can then transmit the selected display parameter settings to an electronic display, which can implement the selected parameter settings. In other implementations, the selected display parameter settings can be transmitted (stage 825) directly to the electronic display, bypassing the processor.

Figure 9:
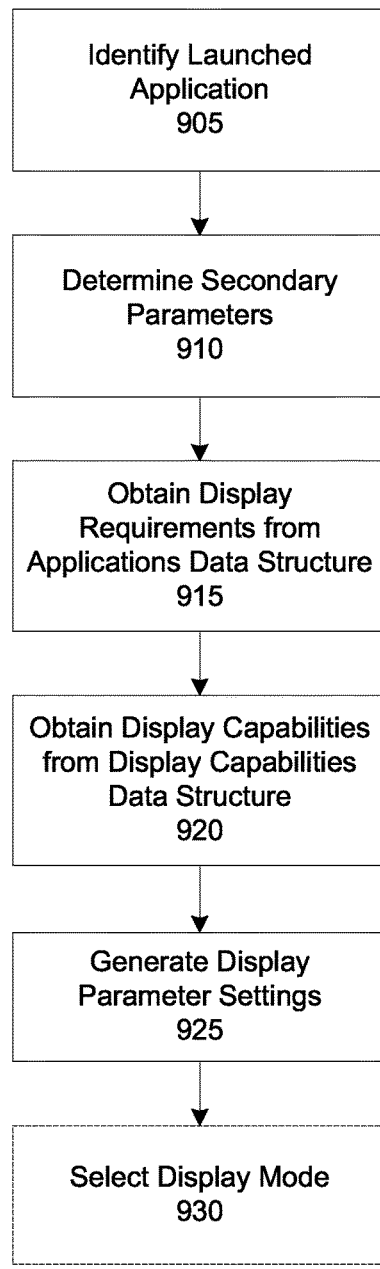
FIG. 9 shows a flow diagram of an example process for selecting display parameter settings.

FIG. 9 shows a flow diagram of an example process 900 for selecting display parameter settings. The stages of the process 900 can be used, for example, to implement stage 820 of the process 800 shown in FIG. 8. The process 900 includes identifying a launched application (stage 905), determining secondary parameters (stage 910), obtaining display requirements from an application data structure (stage 915), obtaining display capabilities from a display capability data structure (stage 920), and generating the display parameter settings (stage 925). In some implementations, the process 900 also includes selecting a display mode (stage 930).

The process 900 includes identifying a launched application (stage 905). The launched application can be identified, for example, by its name, a unique serial number, or any other type of information that uniquely identifies the launched application. In some implementations, the launched application can be identified by a software module, such as the parameter selection module 720 shown in FIG. 7. For example, the parameter selection module 720 shown in FIG. 7 can interact with the operating system 306 shown in FIG. 3 to identify the application that has been launched.

The process 900 also includes determining secondary parameters (stage 900). Secondary parameters can be any type of information impacting the performance a display device or of the computing device to which the display device is connected. In some implementations, secondary parameters can be environmental conditions of the area in which the display device is located, such as an ambient light level. For example, the ambient light level can be determined by any type of photodetector in the vicinity of the display device. When the device is located in a relatively dark environment, it can be determined that the ambient light level is relatively low, whereas if the device is located in a relatively bright environment, it can be determined that the ambient light level is relatively high.

Secondary parameters can also include information relating to the operating characteristics of the device itself. For example, the type of power source connected to the device can be a secondary parameter. Therefore, it can be determined whether the device is electrically connected to a wall outlet, an internal battery, or some other type of power source. If it is determined that the device is connected to a power source whose energy supply is limited, such as an internal battery, it can further be determined how much power remains before the power source is depleted.

The process 900 also includes obtaining display requirements from an application data structure (stage 915). As discussed above in connection with FIG. 4, the application data structure 400 shown in FIG. 4 can include identification information for each application that can be executed by the computing device, as well as display parameter information for each application. In some implementations, a software module such as the parameter selection module 720 shown in FIG. 7 can obtain (stage 915) the display requirements from the application data structure.

For example, the parameter selection module 720 shown in FIG. 7 can access the application identification information that was determined in stage 905 of the process 900. Then, the parameter selection module 720 shown in FIG. 7 can refer to the entry in the application data structure whose identification information matches the identification information of the launched application. A number of display requirements can then be obtained (stage 915). For example, the parameter selection module 720 shown in FIG. 7 can obtain the preferred values for display parameters such as frame rate, bit depth, color gamut, or any other parameter recorded in the application data structure. The parameter selection module 720 shown in FIG. 7 can also obtain minimum required values for each of these parameters. In some implementations, the launched application may perform better when the display is operated at a preferred value of each parameter, but may still be functional when the display is operated at a value greater than or equal to the minimum value for each parameter.

The process 900 also includes obtaining display capabilities from a display capability data structure such as the display capability data structure 500 shown in FIG. 5 (stage 920). As discussed above in connection with FIG. 5, the display capability data structure 500 shown in FIG. 5 can store information corresponding to the operating characteristics of the display device. For example, the display capability data structure 500 shown in FIG. 5 can store information for a number of display parameters, such as frame rate, bit depth, color gamut, or any other adjustable display parameter. For each parameter, the display capability data structure 500 shown in FIG. 5 can store all of the values that the display is capable of implementing.

For example, the display may be capable of displaying images at frame rates of about 60 Hz, 30 Hz, 24 Hz, and 1 Hz, but may not be capable of displaying images at intermediate frame rates, such as about 50 Hz. In some implementations, the display capabilities can be determined (stage 920) by a software module such as the parameter selection module 720 shown in FIG. 7. The parameter selection module 720 shown in FIG. 7 can read and store the parameter values from the display capability data structure 500 shown in FIG. 5.

The process 900 also includes generating display parameter settings (stage 925). The parameter settings can be generated based on any number of factors, such as the identity of the launched application determined in stage 905, the secondary parameters determined in stage 910, the display requirements obtained from the application data structure in stage 915, the display capabilities obtained from the display capability data structure in stage 920, or any other factors that may be relevant to the performance of the display device. As described above in connection with FIG. 7, the display parameter settings can be generated by a software module such as the parameter selection module 720 shown in FIG. 7.

In some implementations, the parameter selection module 720 shown in FIG. 7 can be used to balance competing priorities in generating the display parameter settings (stage 925). For example, the application data structure 400 shown in FIG. 4 may indicate a large preferred bit depth for a launched application. However, if it is determined in stage 910 that the ambient light level surrounding the display is high, the parameter selection module 720 shown in FIG. 7 may select a relatively small value for the bit depth, because a viewer is unlikely to perceive fine distinctions in color associated with a high bit depth due to the high ambient light level.

In another example, the application data structure 400 shown in FIG. 4 may indicate that a high frame rate is preferred for a given application. However, it may have been determined in stage 910 that there is relatively little battery life remaining. Accordingly, the parameter selection module 720 shown in FIG. 7 may generate (stage 925) a value for the frame rate parameter that is lower than the preferred frame rate in order to reduce power consumption. In this example, the parameter selection module 720 shown in FIG. 7 may ensure that the generated frame rate does not fall below the minimum required frame rate included in the application data structure.

The display capabilities obtained in stage 920 can also be used to generate (stage 925) the display parameter settings. For example, the parameter selection module 720 shown in FIG. 7 can select optimal values for parameters according to the application data structure 400 shown in FIG. 4 and the secondary parameters, as discussed above. The parameter selection module 720 shown in FIG. 7 may then refer to the display capability data structure 500 shown in FIG. 5 to ensure that the display device will be capable of implementing the generated parameters. In some implementations, the parameter selection module 720 shown in FIG. 7 can generate parameter values based on the values from the display capability data structure 500 shown in FIG. 5 that are closest to the preferred values from the application data structure 400 shown in FIG. 4. In other implementations, if the preferred parameter values form the application data structure 400 shown in FIG. 4 exceed the maximum values from the display capability data structure 500 shown in FIG. 5, the parameter selection module 720 shown in FIG. 7 can generate parameter settings equal to the maximum values from the display capability data structure 500 shown in FIG. 5.

In some implementations, the process 900 also includes selecting a display mode (stage 900). For example, a display mode can be selected from a data structure such as the display mode data structure 600 shown in FIG. 6. A display mode can correspond to various priorities or display performance objectives of the computing device. Each display mode can have associated parameter values that are selected to accomplish the objectives of the display mode.

For example, a power save mode can represent the display operating characteristics that should be implemented by the display when conserving power is a priority. If it is determined in stage 910 that the device is running on a battery, a power save mode can be selected. In this example, the display parameter corresponding to frame rate or maximum brightness level may have a low value, which can allow the display to operate in a manner that reduces power consumption. In some implementations, the selection of a display mode can alter the selection of display parameters, so that the parameters generated in stage 925 may be changed to accommodate higher priorities represented by the mode selected in stage 930.

FIG. 10 shows a flow diagram of an alternative process 1000 for transmitting display parameter settings to a display module. The stages of the process 1000 are similar to the stages of the process 800 shown in FIG. 8. For example, the process 1000 includes maintaining, by an operating system coupled to a computer processor, an application data structure that identifies each of a plurality of software applications executable by the processor and their corresponding graphical output specifications (stage 1005). Stage 1005 of the process 1000 corresponds to stage 805 of the process 800. The process 1000 includes maintaining, by the operating system, a display capability data structure that identifies a plurality of variable display parameters and a plurality of settings for each of the variable display parameters, based on the capabilities of a display module coupled to the computer processor (stage 1010). Stage 1010 of the process 1000 corresponds to stage 810 of the process 800. The process 100 includes receiving, by the operating system, a user request to launch one of the plurality of software applications (stage 1015). Stage 1015 of the process 1000 corresponds to stage 815 of the process 800. The process 1000 includes selecting, by a display control module responsive to receiving the user request, a set of display parameter settings for use in outputting graphical information from the launched application. The selection is made based on data stored in the application data structure and the display capability data structure (stage 1020). Stage 1020 of the process 1000 corresponds to stage 820 of the process 800. The process 1000 also includes transmitting, by the computer processor, the selected set of display parameter settings to the display module (stage 1025). Stage 1025 of the process 1000 corresponds to stage 825 of the process 800.

Figure 11:
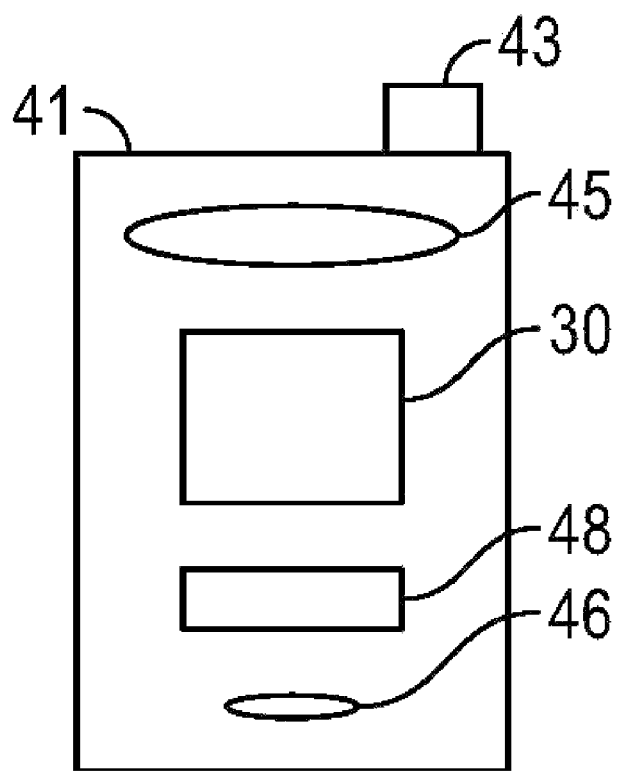
FIGS. 11 and 12 show system block diagrams illustrating a display device that includes a plurality of display elements Like reference numbers and designations in the various drawings indicate like elements.
Figure 12:
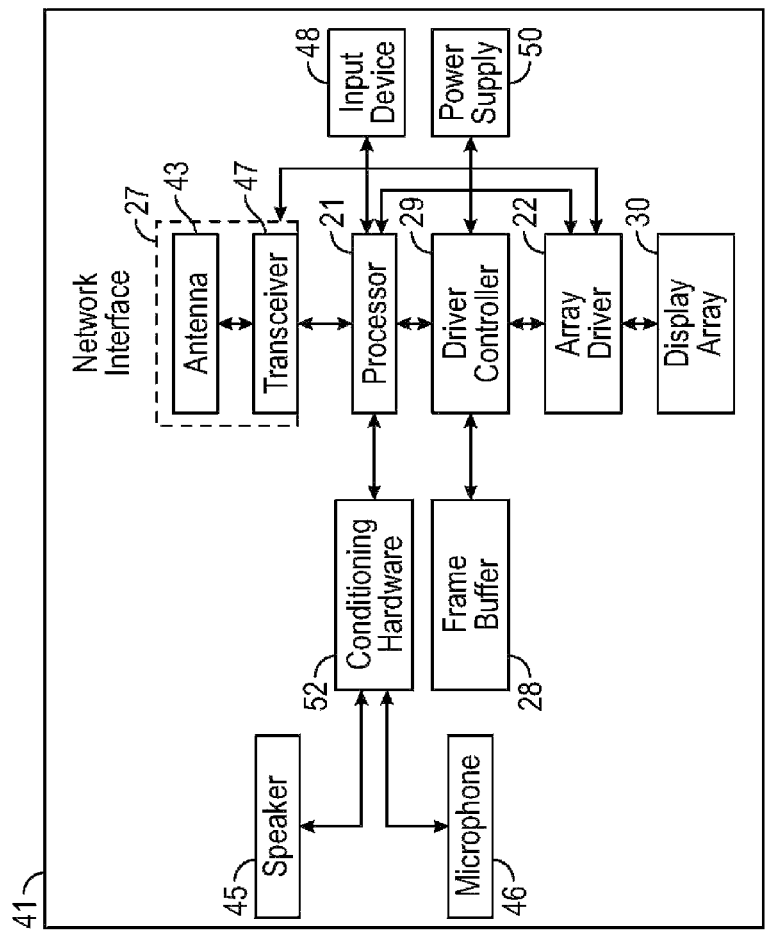

FIGS. 11 and 12 show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL displays, OLED, STN display, LCD, TFT LCD, or a non-flat-panel display, such as a CRT or other tube device. In addition, the display 30 can include a mechanical light modulator-based display, as described herein.

The components of the display device 40 are schematically illustrated in FIG. 11. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 11, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electronic device comprising:
   a display module configurable for generating images according to a plurality of variable display parameters; and
   a processor coupled to the display, configured to:
      execute a plurality of software applications on the electronic device, each having corresponding graphical output specifications;
      execute a display control module resident in an operating system, wherein the display control module is configured to:
         maintain an application data structure to store the corresponding graphical output specifications of each of the plurality of software applications;
         maintain a display capability data structure to store a plurality of settings for each of the variable display parameters; and
         in response to one of the plurality of software applications being launched, process data stored in the application data structure and the display capability data structure to generate a set of display parameter settings to output to the display module for use in outputting graphical output from the launched application,
      wherein the application data structure includes a minimum value and a preferred value for each of the graphical output specifications and the display control module is configured to select the maximum value from the display capability data structure when the preferred value from a corresponding entry in the application data structure exceeds the maximum value from the display capability data structure.

2. The electronic device of claim 1, further comprising:
   a second processor configured to process image data; and
   a memory device configured to communicate with the second processor.

3. The electronic device of claim 1, further comprising a driver circuit configured to send at least one signal to the display; and
   a controller configured to send at least a portion of the image data to the driver circuit.

4. The electronic device of claim 1, further comprising:
   an image source module configured to send the image data to the processor, wherein the image source module comprises at least one of a receiver, a transceiver, and a transmitter.

5. The electronic device of claim 1, further comprising an input device configured to receive input data and to communicate the input data to the processor.

6. The electronic device of claim 1, wherein the plurality of variable display parameters include at least one of: color gamut, bit depth, frame rate, and maximum brightness level.

7. The electronic device of claim 1, wherein the display control module is configured to obtain the set of display parameter settings based in part on a current battery level of the electronic device.

8. The electronic device of claim 1, wherein the display control module is configured to obtain the set of display parameter settings based in part on a display preference user input.

9. The electronic device of claim 1, wherein the display control module is configured to obtain the set of display parameter settings based in part on ambient light data.

10. The electronic device of claim 1, wherein the display control module is configured to process data stored in the application data structure and the display capability data structure by selecting an operating mode having a plurality of associated display parameter settings.

11. The electronic device of claim 1, wherein the application data structure includes a minimum value and a preferred value for each of the graphical output specifications.

12. A method of determining display parameter settings for display of graphical output from an application, the method comprising:

maintaining, by a display control module resident in an operating system executing on a processor, an application data structure that stores corresponding graphical output specifications of a plurality of software applications executable by the processor, wherein the application data structure includes a minimum value and a preferred value for each of the graphical output specifications;

maintaining, by the display control module, a display capability data structure that stores a plurality of variable display parameters and a plurality of settings for each of the variable display parameters, based on the capabilities of a display module coupled to the processor;

selecting, by a display control module responsive to one of the plurality of software applications being launched, a set of display parameter settings for use in outputting graphical information from the launched application based on data stored in the application data structure and the display capability data structure, wherein selecting the set of display parameter settings further comprises selecting the maximum value from the display capability data structure when the preferred value from a corresponding entry in the application data structure exceeds the maximum value from the display capability data structure; and transmitting, by the processor, the selected set of display parameter settings to the display module.

13. The method of claim 12, wherein maintaining the display capability data structure includes maintaining values for at least one of: color gamut, bit depth, frame rate, and maximum brightness level.

14. The method of claim 12, wherein selecting the set of display parameter settings is further based on a current battery level of a battery electrically coupled to the display module.

15. The method of claim 12, wherein selecting the set of display parameter settings is further based on ambient light data.

16. The method of claim 12, further comprising processing data stored in the application data structure and the display capability data structure, wherein the processing includes selecting an operating mode having a plurality of associated display parameter settings.

17. An electronic device comprising:

means for maintaining an application data structure that stores corresponding graphical output specifications of a plurality of software applications executable by the processor, wherein the application data structure includes a minimum value and a preferred value for each of the graphical output specifications;

means for maintaining a display capability data structure that stores a plurality of variable display parameters and a plurality of settings for each of the variable display parameters, based on the capabilities of a display module coupled to the processor;

means for receiving a request to launch one of the plurality of software applications;

means for selecting a set of display parameter settings for use in outputting graphical information from the launched application, wherein the selection is made based on data stored in the application data structure and the display capability data structure, and wherein the means for selecting the set of display parameter settings is configured to select the maximum value from the display capability data structure when the preferred value from a corresponding entry in the application data structure exceeds the maximum value from the display capability data structure; and means for transmitting the selected set of display parameter settings to the display module.

18. The electronic device of claim 17, wherein the plurality of variable display parameters include at least one of: color gamut, bit depth, frame rate, and maximum brightness level.

19. The electronic device of claim 17, further comprising means for obtaining the set of display parameter settings based in part on a current battery level of the electronic device.

20. The electronic device of claim 17, further comprising means for selecting an operating mode having a plurality of associated display parameter settings.

21. The electronic device of claim 17, further comprising means for obtaining the set of display parameter settings based in part on ambient light data.

22. A non-transitory computer readable medium having instructions encoded thereon which, when executed by a processor, cause the processor to perform a method of determining display parameter settings for display of graphical output from an application, the method comprising:

maintaining, by a display control module resident in an operating system executing on a processor, an application data structure that corresponding graphical output specifications of a plurality of software applications executable by the processor, wherein the application data structure includes a minimum value and a preferred value for each of the graphical output specifications;

maintaining, by the display control module, a display capability data structure that stores a plurality of variable display parameters and a plurality of settings for each of the variable display parameters, based on the capabilities of a display module coupled to the processor;

selecting, by a display control module responsive to one of the plurality of software applications being launched, a set of display parameter settings for use in outputting graphical information from the launched application based on data stored in the application data structure and the display capability data structure, wherein selecting the set of display parameter settings further comprises selecting the maximum value from the display capability data structure when the preferred value from a corresponding entry in the application data structure exceeds the maximum value from the display capability data structure; and transmitting, by the processor, the selected set of display parameter settings to the display module.

23. The non-transitory computer readable medium of claim 22, wherein maintaining the display capability data structure includes maintaining values for at least one of: color gamut, bit depth, frame rate, and maximum brightness level.

24. The non-transitory computer readable medium of claim 22, wherein selecting the set of display parameter settings is further based on a current battery level of a battery electrically coupled to the display module.

25. The non-transitory computer readable medium of claim 22, wherein selecting the set of display parameter settings is further based on ambient light data.

26. The non-transitory computer readable medium of claim 22, wherein the method further comprises processing data stored in the application data structure and the display capability data structure, wherein the processing includes selecting an operating mode having a plurality of associated display parameter settings.

27. An electronic device comprising:
a display module configurable for generating images according to variable display settings including a bit depth parameter; and
a processor coupled to the display, configured to:
execute a plurality of software applications on the electronic device, each having corresponding graphical output specifications; and
execute a display control module resident in an operating system, wherein the display control module is configured to:
generate a setting for the bit depth parameter based on information relating to an application being launched including a minimum value and a preferred value for the bit depth parameter, and based on information relating to the capabilities of the display module including a maximum value for the bit depth parameter, wherein the display control module is configured to select the maximum value for the bit depth parameter, in response to a determination that the preferred value of the bit depth parameter exceeds the maximum value of the bit depth parameter.

28. The electronic device of claim 27, wherein the display control module is configured to generate the setting for the bit depth parameter based in part on at least one of a current battery level of the electronic device, a display preference user input, and ambient light data.

* * * * *